(12) United States Patent
Khan et al.

(10) Patent No.: US 11,720,563 B1
(45) Date of Patent: Aug. 8, 2023

(54) DATA STORAGE AND RETRIEVAL SYSTEM FOR A CLOUD-BASED, MULTI-TENANT APPLICATION

(71) Applicant: Apttus Corporation, San Mateo, CA (US)

(72) Inventors: Haseebulla M. Khan, San Ramon, CA (US); Umamaheswaran Manivannan, Bangalore (IN); Pritam Tingre, Pune (IN)

(73) Assignee: Apttus Corporation, San Mateo, CA (US)

( * ) Notice: Subject to any disclaimer, the term of this patent is extended or adjusted under 35 U.S.C. 154(b) by 0 days.

(21) Appl. No.: 17/991,352

(22) Filed: Nov. 21, 2022

(51) Int. Cl.
    *G06F 16/24*     (2019.01)
    *G06F 16/2453*     (2019.01)
    *G06F 16/22*     (2019.01)

(52) U.S. Cl.
    CPC .... *G06F 16/24542* (2019.01); *G06F 16/2219* (2019.01); *G06F 16/24532* (2019.01); *G06F 16/24539* (2019.01)

(58) Field of Classification Search
    CPC .............................................. G06F 16/24542
    See application file for complete search history.

(56) References Cited

U.S. PATENT DOCUMENTS

| | | | |
|---|---|---|---|
| 11,604,799 B1 * | 3/2023 | Bigdelu | G06F 3/0482 |
| 2020/0334241 A1 * | 10/2020 | Muralidhar | G06F 16/2358 |
| 2021/0064483 A1 * | 3/2021 | Paramasivam Balakrishnan | G06F 11/1471 |
| 2021/0107141 A1 * | 4/2021 | Shrivastava | G06N 20/00 |
| 2022/0318223 A1 * | 10/2022 | Ahluwalia | G06F 16/2282 |

* cited by examiner

Primary Examiner — Mohammad S Rostami
(74) Attorney, Agent, or Firm — Lessani Law Group, PC

(57) ABSTRACT

The present disclosure relates to a large-scale and low-latency data retrieval and storage system for a multi-tenant, cloud-based application, such as a Quote-to-Cash application. Conventionally, such applications rely heavily on SQL databases, which have difficultly providing service and performance at scale. The system of the present disclosure uses a distributed blob storage for data records, wherein each tenant has their own partition within the blob storage. Blob storage is able to provide service and performance at scale. Blob storage alone, however, cannot solve the needs of a multi-tenant, cloud-based application in which customer inputs complex data queries to retrieve data records. The present disclosure describes a system that converts basic blob storage into a data store can manage complex data queries in an efficient and scalable way for multiple tenants. This includes storing queryable data in data structures in a persistent distributed cache and executing queries on the data structures to identify the record IDs that satisfy the query. The records are then retrieved from blob storage using parallel fetch operations.

20 Claims, 18 Drawing Sheets

STORING METADATA FILE IN BLOB STORAGE AND METADATA CACHE

FORMULA FIELD PROCESSING

EXAMPLE ARCHITECTURE

DATA STORAGE AND RETRIEVAL SYSTEM FOR A CLOUD-BASED, MULTI-TENANT APPLICATION

BACKGROUND OF THE INVENTION

1. Field of the Invention

This invention relates generally to data storage and retrieval for a multi-tenant application, and more specifically to a system and method for large-scale, low-latency data storage and retrieval for a plurality of different customers of a multi-tenant cloud-based application.

2. Description of the Background Art

Many multi-tenant SaaS-based applications, such as Quote-to-Cash applications, use a specific combination of data access patterns that require systems to be able to serve data needs in a performant way. Such applications rely heavily on Sequel (SQL)/Relational databases for data storage and retrieval. SQL databases serve the needs of these types of applications but fail to provide services at scale and especially performance at scale.

FIG. 1 illustrates a conventional Data Retrieval and Storage System for a Quote-to-Cash application 110 that runs on a multi-tenant SaaS platform, such as the SALESFORCE PLATFORM. Each customer's data is stored in a multi-tenant SQL database system 120. Each customer typically has their own data schema for data objects used by the Quote-to-Cash application. For example, if there is an object templates for "Agreements" there may be standard fields used by all customer, as well as custom fields specified by each customer. Query operations are performed on the database system. While SQL database system are designed to handle complex data queries on data records, they can only do serial reads and writes.

Customers are assigned to at a single point of deployment of the multi-tenant SQL database system. Customer at the same point of deployment will share the same CPU, memory, and other hardware resources. This architecture results in a "noisy neighbor" problem, in that, if one customer is consuming a lot of resources, this will negatively impact the other customer.

As the amount of data used by an application grows, the complexity of maintaining performance Service Level Agreements (SLAs) increases by multiple folds. These multi-tenant SQL-based systems generally do not scale well as traffic and data-processing demands increase. They scale by increasing the hardware of the system, such as adding more RAM/memory and CPUs. Even with the hardware increase, the scale is limited by the maximum hardware the system can support. This type of scaling is referred to as vertical scaling, which has limitations and serious cost implications.

At a point of deployment, SQL systems typically have a single write node, which limits its ability to write at a massive scale. This renders the data retrieval and storage architecture for the Quote-to-Cash application (or other application running on a multi-tenant data storage and retrieval platform) complex, as it has to manage multiple customers (multi-tenancy) and have high-scale and performance.

Variable (non-uniform) tenancy in SQL/relational database systems enhances the noisy neighborhood problem. A bigger tenant will overwhelm smaller tenants by consuming more resources from the shared resource pool of CPU, RAM and Network bandwidth. SQL systems have a single write replica architecture that is also shared across multiple tenants. Smaller tenants are often become bottleneck as SQL systems does not allocate compute, memory and storage factors according to the size of the tenants.

Companies in other domains (not related to Quote-to-Cash) try to solve the scale problems by using data sharding techniques. Managing data sharding increases the complexity of the system, which in turn increases the cost of maintaining the system. While sharding may solve the problem of scale to some extent, it introduces other types of complexities that make the system go through long cycles of feature releases. The data sharding architecture tends to work well in single-tenant systems or systems with uniform multi-tenants (e.g., each tenant is a user, as opposed to an organization). With variable multi-tenancy (meaning some tenants are large, whereas other are small) and the need for enterprise customers to have extensible and customizable data schemas, the scale and performance problems cannot be solved easily by pure data sharding techniques.

Therefore, there is demand for a new data retrieval and storage system that can handle the high-scale, high-performance data storage and retrieval needs of applications that have variable multi-tenancy and enterprise customers that require extensible and customizable data schemas.

SUMMARY OF THE DISCLOSURE

The present disclosure relates to a large-scale and low-latency data retrieval and storage system for a multi-tenant, cloud-based application, such as a Quote-to-Cash application. The system uses blob storage to store customer data records. Blob storage is a distributed, cloud-based storage system that is designed to store large "blobs" of data, such as images, pdfs, and other types of documents and files. Blob storage is segmented based on containers or buckets which completely isolated the data from each tenant/customer. Blob storage is a distributed file system that scales regardless of how much data is stored. Unlike a SQL system which can handle only serial reads and writes, a blob storage system can perform parallel reads and writes. As of the writing of this disclosure, blob storage is designed to work at petabytes scale data and can handle concurrent reads of 5000+ per second per object per tenant. Each tenant within the Blob storage can be scaled to this capacity, regardless of the size of the tenant (truly a distributed architecture). Therefore, Blob storage is able to handle tenants of variable size without incurring the "noisy neighbor" problem endemic in SQL/Relational database storage systems.

Blob storage alone, however, cannot solve the needs of a multi-tenant, cloud-based application in which customers input complex data queries to retrieve data records. Blob storage is simple key-value storage system that is designed to handle only simple data-access protocols. Therefore, the system of the present disclosure includes novel data retrieval, query processing, and data storage methods that effectively convert basic blob storage into a data store can manage complex data queries in an efficient and scalable way.

These methods include extracting queryable data from the data records in the blob storage and organizing the queryable data in data structures on which query operations can be efficiently performed. The data structures are stored outside the blob storage, in a persistent disturbed cache (PDC). Examples of the data structures are sorted sets and hash sets. Data queries from the multi-tenant cloud-based application are processed on the data structures in the persistent distributed cache, not on the data records in the blob storage. Within the data structures, the queryable data is stored in association with the records IDs from which the queryable data was extracted.

The data stored in the persistent distributed cache enables the system to identify the record IDs that satisfy customer queries on the data records in the blob storage. As described in more detail below, the system makes uses of a predictive low-cost path algorithm that identifies the set of operations on the data structures that will result in the fastest way to identify the record IDs. Once the system identifies the record IDs that satisfy the query, the system retrieves the records from the data cache or blob storage using parallel fetch operations.

Both the blob storage and the persistent distributed cache may be provided by public clouds, such as AMAZON AWS or MICROSOFT AZURE. They can scale linearly. For example, certain cloud providers enable the distributed cache to scale to 500+ node clusters, enabling the distributed cache to process massive amounts of data queries from different tenants. In one embodiment, a method for retrieving and storing data for a plurality of different customers of a multi-tenant cloud-based application comprises the following steps:

enabling a plurality of different customers to define customer-specific data objects using a data object schema definition for each data object, wherein a data object schema definition is a metadata definition;
  receiving data object schema definitions for data objects from different customers;
  for each data object schema definition received from a customer, performing the following:
    using the data object schema definition to identify the queryable fields for the data structure;
    creating a first data structure in a persistent distributed cache for each queryable field in the data object, wherein the first data structure has a key field for storing the values of the queryable field for instances of the data object, and a value field for storing the corresponding record IDs of the instances of the data object;
    creating a second data structure in the persistent distributed cache for the data object, wherein the second data structure has a key field for storing record IDs of instances of the data object and a value field for storing corresponding queryable field values and wherein each of the first and second data structures is specific to a customer;
  receiving customer data records for storage, wherein:
    the customer data records are instances of data objects defined by data object schema definitions;
    the system receives and stores data records for a plurality of different customers;
    for each data record received from a customer, the system performs the following: storing the data recording in a multi-tenant blob storage system, wherein
      the blob storage includes partitions for each customer such that the data records for a customer are stored only in the customer's partition;
      identifying the queryable fields in the data record using the data object schema definition for the data object to which the data record corresponds;
      extracting values for the queryable fields from the data records; and
      adding the queryable field values and the record ID of the data record to the customer's first and second data structures for the data object to which the data record corresponds in the persistent distributed cache; wherein for each first data structure, the key-value pairs in the first data structure are sorted according to a ranking criterion applied to the queryable field values in the first data structure; and
    a subset of customer data records is also stored in a transient data cache; receiving a data records query from a customer;
  constructing a query plan comprising a plurality of fetch steps, wherein each fetch step in the query plan represents an operation on one of the customer's first or second data structures in the persistent distributed cache;
  executing the query plan, wherein executing the query plan comprises:
    using the customer's first and second data structures in the persistent distributed cache to identify any record IDs that satisfy the query conditions; and
    retrieving the data records having the identified record IDs from the customer's partition in the blob storage or from the data cache using parallel fetch operations.

DETAILED DESCRIPTION OF THE PREFERRED EMBODIMENTS

The present disclosure relates to a large-scale and low-latency data retrieval and storage system for a multi-tenant, cloud-based application, such as a Quote-to-Cash application. The methods described herein are performed by a computer system that executes a multi-tenant, cloud-based application ("the system"). The system may include or access servers, storage systems, networks, operating systems, and databases.

1. Definitions

As used herein, a "data object" is a type of data record that includes fields of data. A data object is defined by a data object schema definition, which is object metadata that typically includes the name of the data object, the fields of the data object, and the data types accepted by each field. "Data records" or "customer records" are instances of a data object. For example, in a Quote-to-Cash application that enables a user to generate quotes, there may be a "quote"

object. The specific quotes created and saved by the customer are instances of the "quote" object. The instances of the quote object, namely the quotes created by the customer, all adhere to the schema definition for the quote object. This means that all the quotes will have the fields specified in the schema definition and the data in each field will be of the data type specified for the field in the schema definition.

"Quote-to-Cash" is the sales lifecycle of a customer, which starts with a creating a quote and ends with revenue generation. A Quote-to-Cash application provides functionality that enables a user to create and manage data, including documents, in the Quote-to-Cash lifecycle. The CONGA "Configure, Price, Quote" application is an example of a Quote-to-Cash application.

Figure 1:
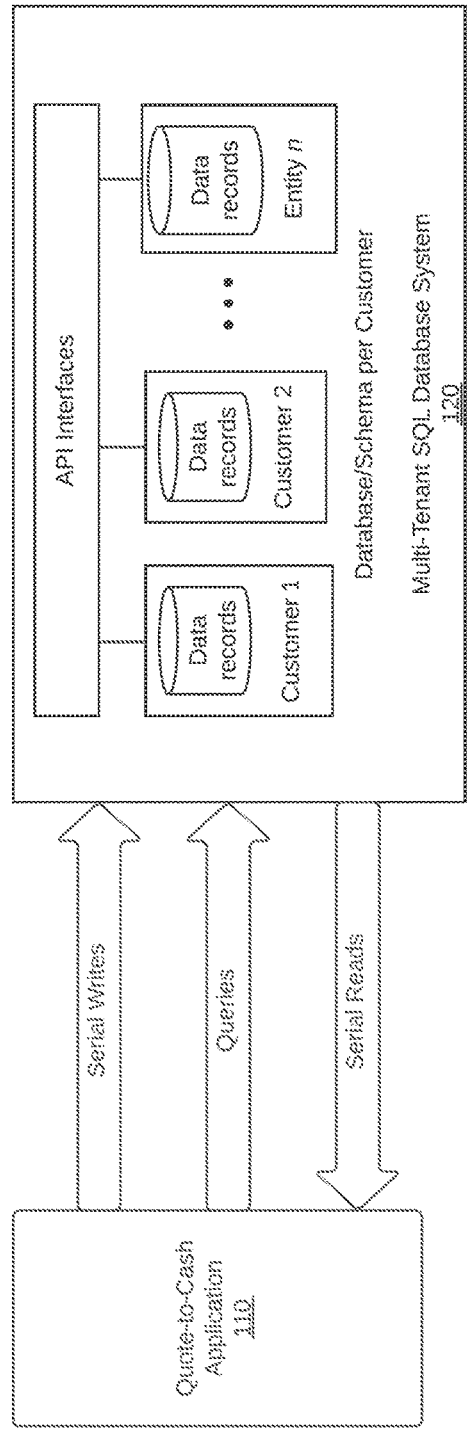
FIG. 1 is a block diagram that illustrates a prior art data storage and retrieval system for a multi-tenant, cloud-based application.
Figure 2:
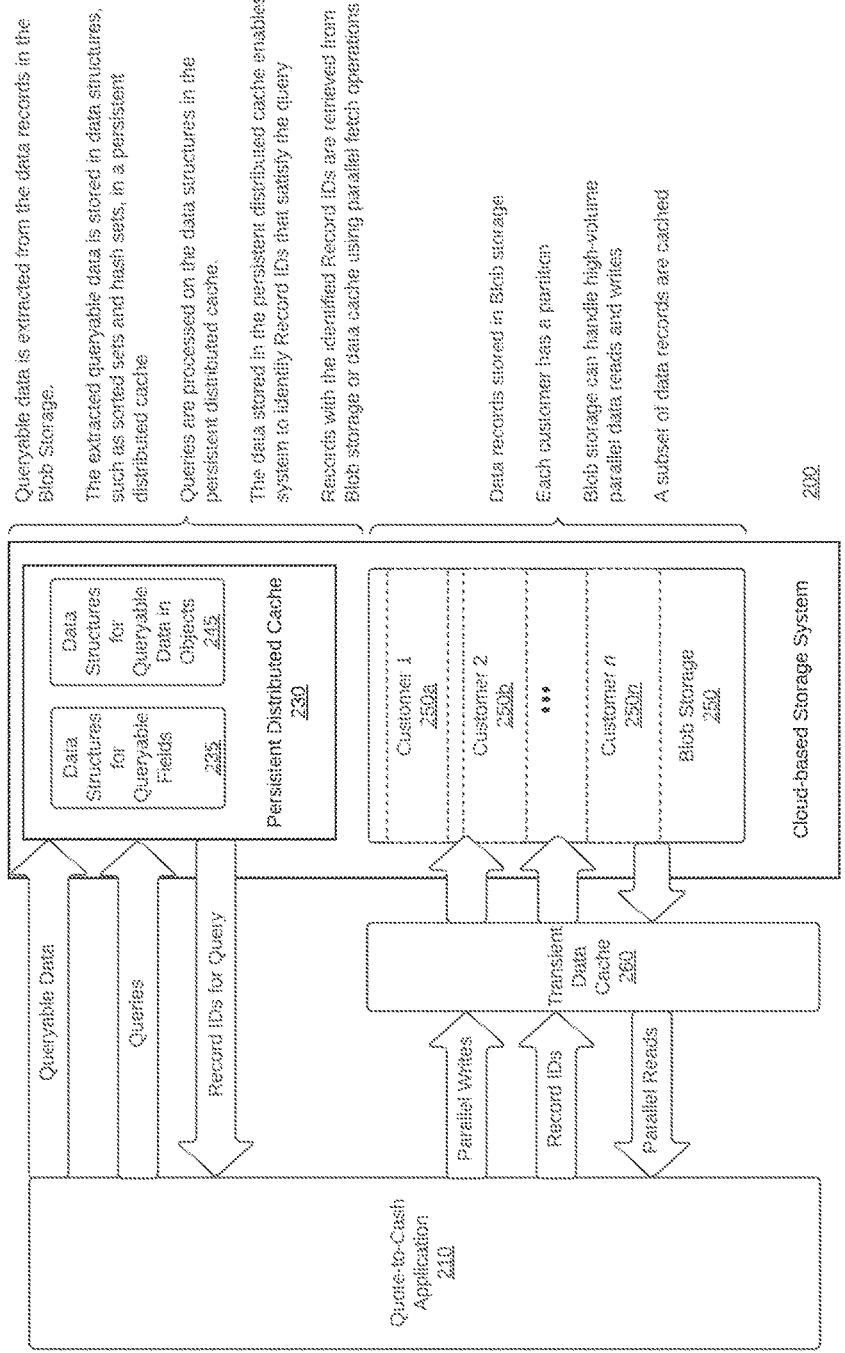
FIG. 2 is a block diagram that illustrates a novel data storage and retrieval system for a multi-tenant, cloud-based application according to one embodiment.

2. Overview of Novel Data Retrieval and Storage System for a Multi-Tenant Application with Complex Data Query Requirements FIG. 2 illustrates an overview of the novel data retrieval and storage system 200 for a multi-tenant, cloud-based application 210 that enables a user to create and store data records, as well as enter multi-parameter queries for data records. The system uses blob storage 250 to store customer data records. Blob storage is a distributed, cloud-based storage system that is designed to store large "blobs" of data, such as images, pdfs, and other types of documents and files. Blob storage is segmented based on containers or buckets which completely isolates the data from each tenant/customer. Blob storage is a distributed file system that scales regardless of how much data is stored. Unlike an SQL system which can handle only serial reads and writes, a blob storage system can perform parallel reads and writes. As of the writing of this disclosure, blob storage is designed to work at petabytes scale data and can handle concurrent reads of 5000+ per second per object per tenant. Each tenant within the blob storage can be scaled to this capacity, regardless of the size of the tenant (truly a distributed architecture). Therefore, blob storage is able to handle tenants of variable size without incurring the "noisy neighbor" problem endemic in SQL/Relational database storage systems. A subset of data records may also be stored in a transient data cache 260 for even faster retrieval.

Blob storage alone, however, cannot solve the needs of a multi-tenant, cloud-based application in which customers input complex data queries to retrieve data records. Blob storage is simple key-value storage system designed to handle only simple data-access protocols. Therefore, the system of the present disclosure includes novel data retrieval, query processing, and data storage methods that effectively convert basic blob storage into a data store can manage complex data queries from variable multiple tenants in an efficient and scalable way.

These methods include extracting queryable data from the data records in the blob storage and organizing the queryable data in data structures on which query operations can be efficiently performed. The data structures are stored outside the blob storage, in a persistent disturbed cache (PDC) 230. Examples of the data structures are sorted sets and hash sets. Data queries from the multi-tenant cloud-based application are processed on the data structures in the persistent distributed cache, not the data records in the blob storage. Within the data structures, the queryable data is stored in association with the records IDs from which the queryable data was extracted. The data stored in the persistent distributed cache enables the system to identify the record IDs in the blob storage that satisfy the queries. As described in more detail below, the system makes uses of a predictive low-cost path algorithm that identifies the set of operations on the data structures that will result in the fastest way to identify the record IDs. Once the system identifies the record IDs that satisfy the query, the system retrieves the records from the transient data cache or blob storage using parallel fetch operations.

Both the blob storage and the persistent distributed cache may be provided by public clouds, such as AMAZON AWS or MICROSOFT AZURE. They can scale linearly. For example, certain cloud providers enable the distributed cache to scale to 500+ node clusters, enabling the distributed cache to process massive amounts of data queries from different tenants.

3. Method for Storing and Retrieving Data

Figure 3A:
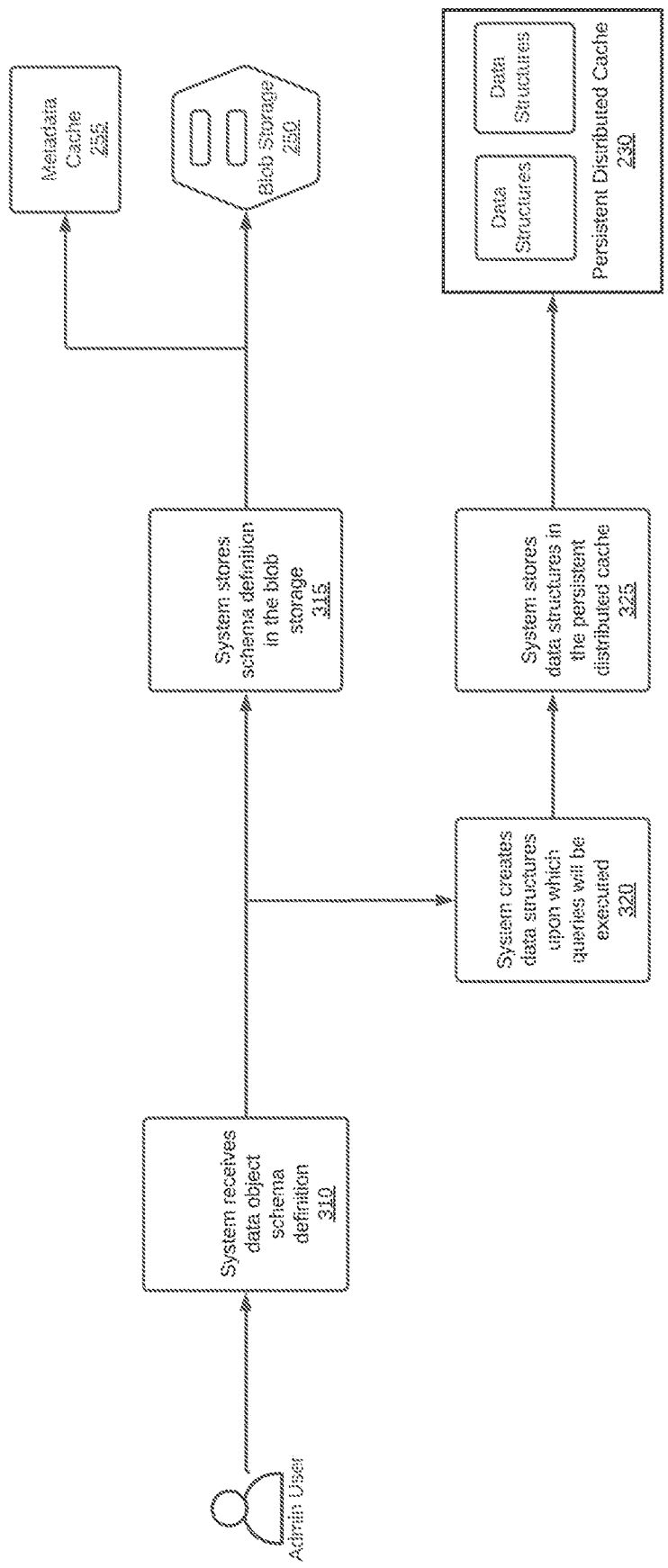
FIGS. 3A-C are flowcharts that illustrate methods for storing and retrieving data records for a multi-tenant application according to one embodiment.
Figure 3B:
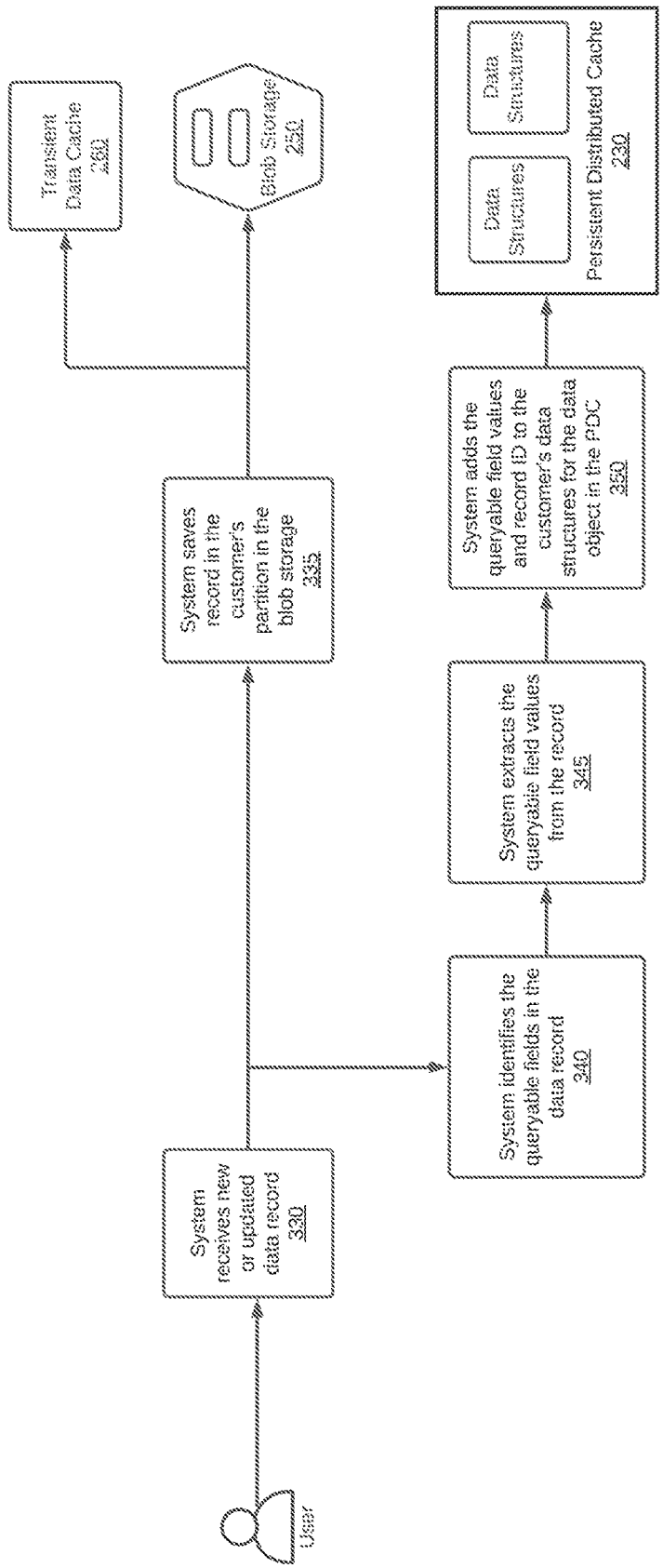
Figure 3C:
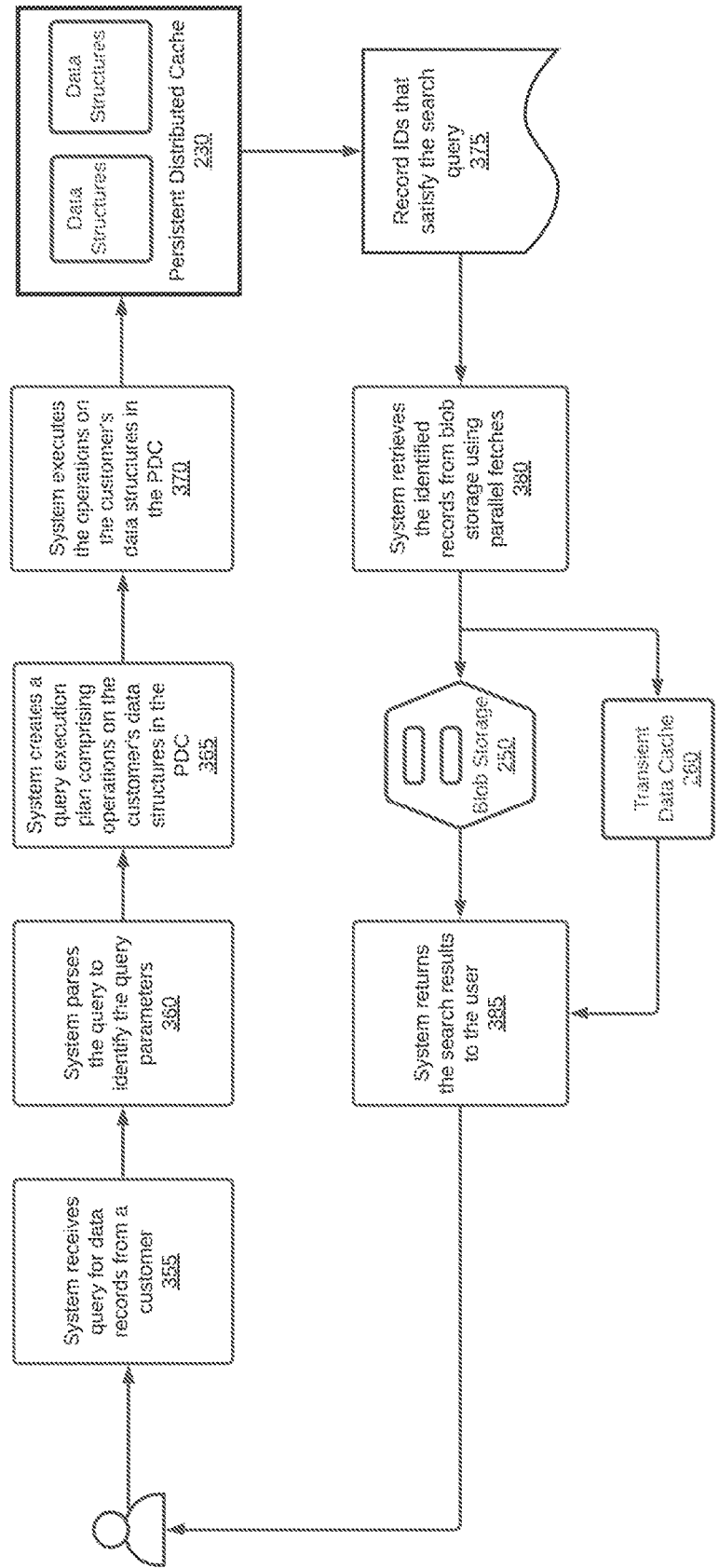

FIGS. 3A-C illustrate methods for storing and retrieving data for the multi-tenant application using the system illustrated in FIG. 2.

3.1 Receiving Object Definition and Creating Data Structures Upon which Queries Will be Executed FIG. 3A illustrates a method for receiving a data object definition and creating data structures upon which queries for instances of the object will be executed. The system provides an interface via which customers can enter data object schema definitions. The system receives a data object schema definition via the interface (step 310) and stores the schema definition in applicable customer's partition in the multi-tenant blob storage (step 315). As discussed below, in certain embodiment, the system may also cache the object definition in a metadata cache 255 for fast access to the definition, as well as perform validation tests on the schema definition.

A data object schema definition includes the name of the data object and its related field definitions and data types (e.g., Integer, String, DateTime, Double, etc.). The field definition also described whether a field is queryable or not in a data fetch query. The system may support both simple (e.g., String, Integer, Double, Identifier, Boolean, DateTime, and AutoNumber) and complex (e.g., Picklist, MultiPicklist, Currency, Complex <T>, Collection <T>) data types.

The system also creates data structures upon which queries for data records for the data object will be executed by the system (step 320). These data structures are stored in the persistent distributed cache (PDC) for fast query processing (step 325). Each customer of the multi-tenant application has its own data structures, as the system will only query a customer's own data. The data structures are described in more detail below.

3.1.1 First Data Structure for Each Queryable Field

The system is able to ascertain the queryable fields for the data object from the data object schema definition. For each of the queryable fields of the data object, the system creates a first type of data structure that will map values for the queryable field to corresponding data record IDs. As data records for the data object are created, the system will extract the values from the queryable fields in the data records and store them in these first type of data structures. To enable fast query processing, the entries in the first type of data structure are sorted according to a ranking criterion applied to the field values. Since the field values are stored in association with record IDs, these first type of data structures enable the system to easily identify the record IDs of records have a field value that satisfies a search query.

In certain embodiments, the first type of data structure is a sorted set. A sorted set is a data structure that comprises "score-member" pairs, which is a type of key-value pair. The score is always sorted and represents a ranking. In these embodiments, the score is based on the queryable field value, and the member is the record ID of the record from which the value was extracted.

In embodiments where the first data structure is a sorted set, the system creates a sorted set for each queryable field of the data object. For example, if a data object has 20 queryable fields, then the system would create 20 sorted sets for the data object, one for each of the 20 queryable fields. An example of a sorted set is set forth below:

TABLE 1

| <Customer A>: SortedSet: Quote.Quantity | |
|---|---|
| Score = Field Value | Member = Record ID |
| 200 | 21 |
| 187 | 12 |
| 130 | 33 |
| 75 | 14 |
| 42 | 33 |
| 22 | 12 |

This sorted set is for a "quantity" field in a data object for a "quote" data object for "Customer A". The field values are ranked from highest value to lowest, and the set is sorted according to the ranking. This enables fast search query. For example, if the system receives a query for quotes having a "quantity" value below 50, it can easily find the record IDs for the quotes having a "quantity" field value below 50. Those skilled in the art will appreciate that Record IDs are typically longer and more complex than those show in Table 1 but have been simplified herein for ease of illustration.

3.1.2 Second Data Structure for the Data Object

The system also creates a second type of data structure for the object as a whole. This second type of data structure maps the record ID of each data record for the object to the queryable field values for that data object. For example, if a data object has 20 queryable fields, then each record ID for that data object would be stored in associated with the 20 queryable field values for that record.

Below is an example of the second type of data structure for a "Quote" object with three queryable fields, namely, "quantity," "price," and "name."

| <Customer A>: Hashset: Quote | |
|---|---|
| Key = Record ID | Queryable Field Values |
| 21 | Quantity: 200 |
| | Price: 34 |
| | Name: Item X |
| 12 | Quantity: 22 |
| | Price: 45 |
| | Name: Item B |
| 33 | Quantity: 42 |
| | Price: 690 |
| | Name: Item D |

In certain embodiments, the second type of data structure is a hash set. A hash set is a key-value data structure that provides fast access to data by directly fetching data with a key. A hash set uses hashes to store elements by applying a hash algorithm to the data being stored.

Both types of data structures store data in the form of key-value pairs. In the first type of data structure, the queryable field value is the "key" and the record ID is the "value." Conversely, in the second type of data structure, the "key" is the record ID, and the "value" is the extracted queryable field values for that record.

3.2 Creating or Updating a Data Record

FIG. 3B illustrates a method for creating or updating a data record in the system illustrated in FIG. 2. In response to a user at a customer saving a new or updated data record, the system receives the data record (step 330) and saves it in the applicable customer's partition within the blob storage (step 335). The system may also save the record in the transient data cache 260. Only a subset of the customer records in the blob storage are stored in the transient data cache 260. For example, it may be the n more recent saved or queried records, wherein n is a positive integer greater than 1.

The data record is an instance of a data object defined by a data object schema definition. The system identifies the queryable fields in the data record from the data object schema definition to which the data record adheres (step 340). The system extracts the queryable field values from the records (step 345) and adds the queryable fields values to the customer's first and second type of data structures for the data object to which the record corresponds (step 350). As discussed above, the queryable field values are stored in association with the record ID of the record in the data structures. The data structures are stored in the persistent distributed cache 230.

3.3. Query Processing

FIG. 3C illustrates a method for processing a data query in the system illustrated in FIG. 2. The application provides an interface via which a user can enter query parameters for a data query on the data records in the blob storage. For example, the application may be a Quote-to-Cash application that enables a user to enter a natural language query for documents or data within the documents.

In response to receiving a data query on the data records (step 355), the system parses the query to identify the query parameters (step 360) and creates a query execution plan (step 365). The query execution plan comprises one or more operations on certain of the first-type and second-type data structures stored in the persistent distributed cache 230.

The system executes the operations in the query execution plan on the customer's applicable data structures in persistent distributed cache (step 370). As a result of executing the operations, the system obtains a list of record IDs (375) that satisfy the search query. The system then retrieves the identified records from the blob storage, or, if applicable, the transient data cache, using parallel fetches (step 380) and returns the query results to the user, performing any post-retrieval processing required (e.g., formula processing) (step 385).

In a conventional database system, the queries are processed directly on the data records themselves. In the system of the present disclosure, the queries are not processed on the data records in the blob storage, but on separate data structures in the persistent distributed cache.

4. Example Embodiment

FIGS. 4A-7B illustrate an example implementation of the system and method described with respect to FIGS. 2 and 3A-3C.

4.1 Example Methods for Data Object Schema Creation

Figure 4A:
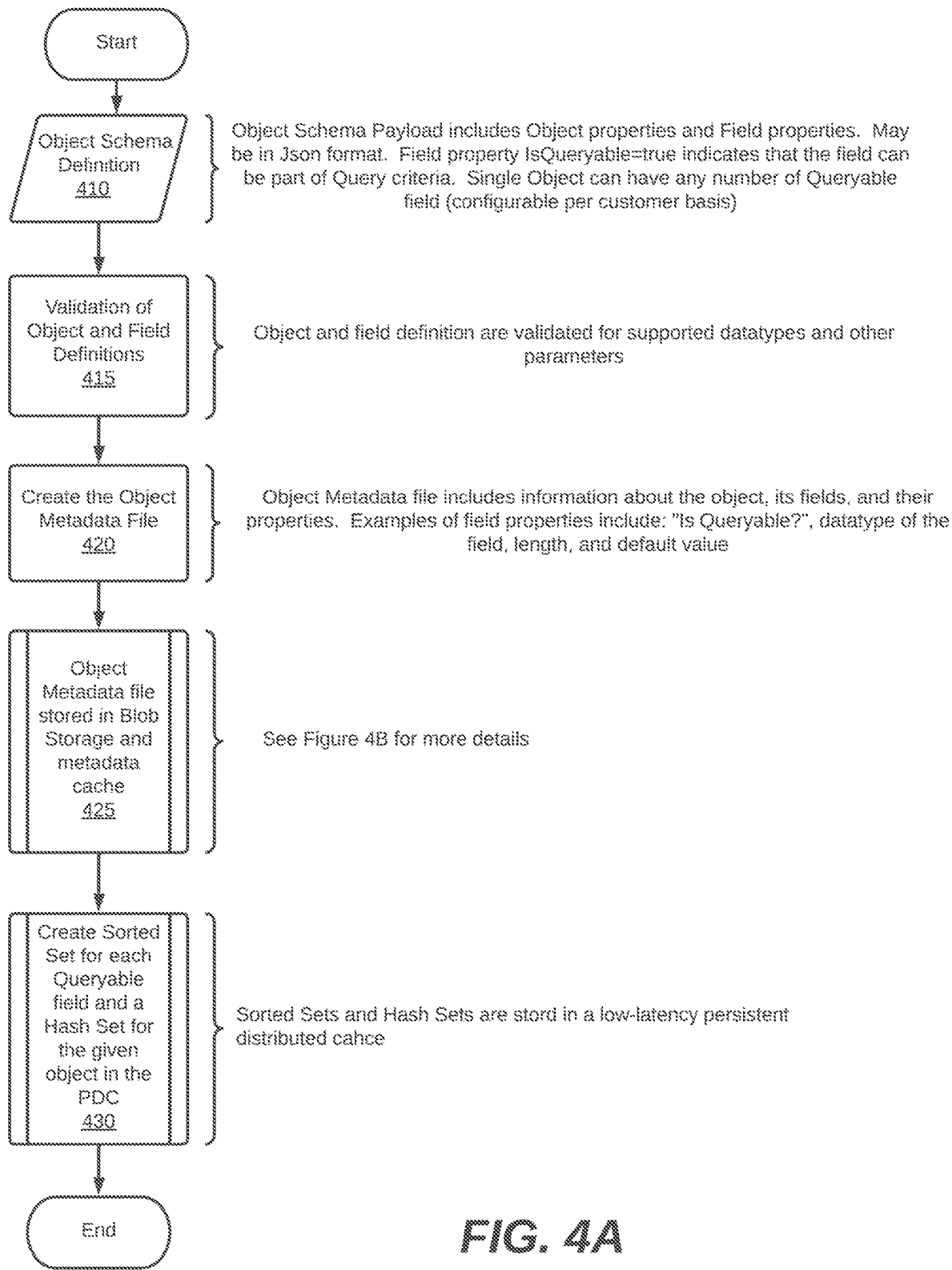
FIGS. 4A-4C are flowcharts that illustrate the data schema creation flow in an example implementation.
Figure 4B:
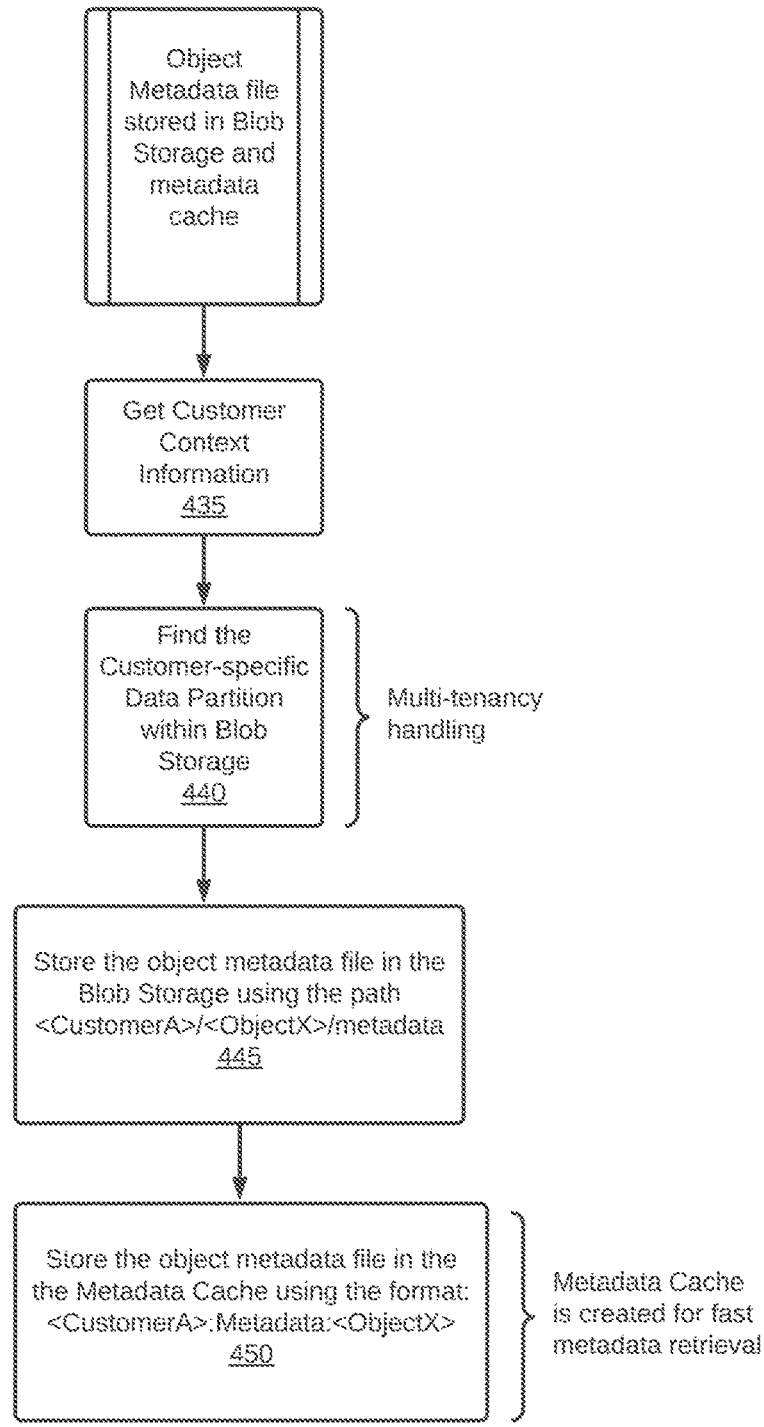
Figure 4C:
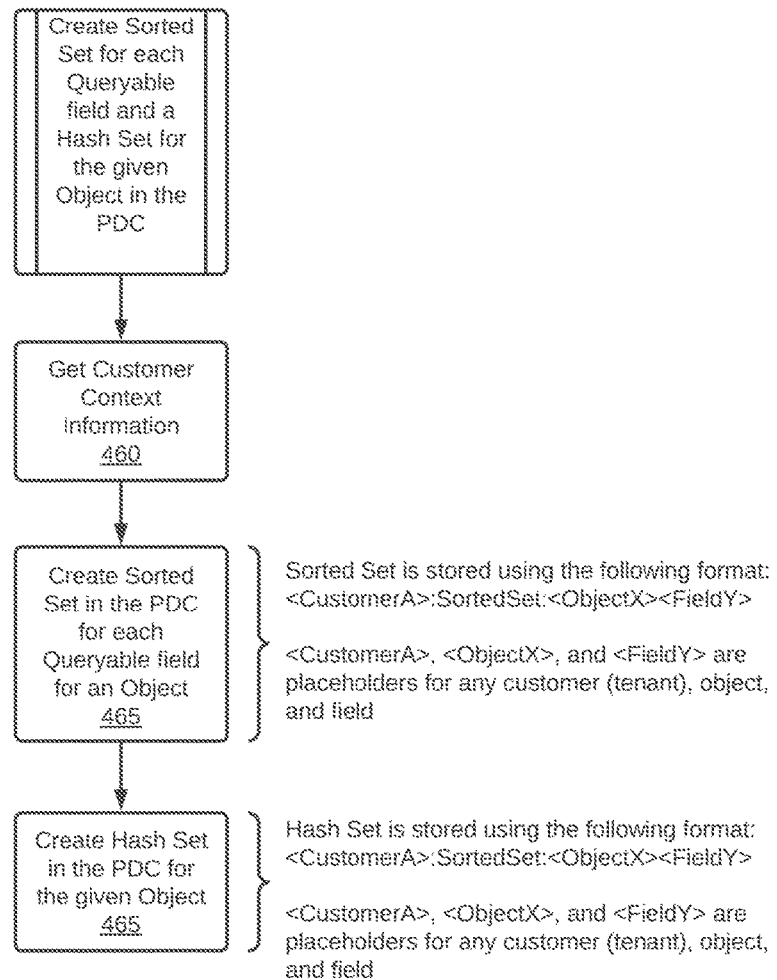

FIGS. 4A-4C illustrate the data schema creation flow according to one embodiment. The system enables users to customize data objects by specifying object properties and field properties. The application 210 includes an interface via which a customer can enter data object schema definition. The system receives a data object schema definition from a customer (step 410). In one embodiment, the schema definition is an object schema payload in JSON format that includes object properties and field properties for each field. One of the field properties is whether the field is queryable. Whether a field is queryable is configurable by the customer. If a field is queryable, this field property is set to true. Other examples of field properties include datatype, length, and default value.

The system validates the object and field definitions (step 415) and creates an object metadata file (step 420). The object metadata file includes all information about the object, its fields, and their properties. As described in more detail in FIG. 4B, the system stores the object metadata file in the blob storage and in the metadata cache (step 425). The system creates a sorted set data structure for each queryable field in the data object and a hash set for the data object as a whole in the persistent distributed cache (step 430).

FIG. 4B illustrates a method for storing the object metadata file in the blob storage and in the metadata cache. The system obtains customer context information for the applicable customer (step 435). Specifically, the system uses the user's login credentials to identify the customer (i.e., organization) to which the user belongs and to retrieve a "Blob connection string" that enables the system to access the correct partition for the customer in the blob storage. The system then stores the object metadata file within the customer's partition (steps 440-445). In one embodiment, Customer A's object metadata file for Object X would be stored under the path <Customer A>/<Object X>/metadata. The system also stores object metadata file in the metadata cache (step 450).

FIG. 4C illustrates a method for creating a sorted set data structure and a hash set data structure for a given object in the persistent distributed cache (PDC). The system identifies the queryable fields in the data object from the metadata file (step 455). The system obtains the customer context information required to access the customer's data in the persistent data cache (step 460). The system then creates a sorted set data structure for each queryable field in the object and stores the sorted sets for the customer in the persistent distributed cache under a unique identifier for the customer (step 465). In one embodiment, the format in which the sorted sets are stored is as follows <Customer A>:SortedSet<Object X><Field Y>, where <Customer A>, <Object X>, and <Field Y>, are placeholders for any customer (tenant), object, and field.

The system also creates a hash set data structure in the PDC for the given object (step 475). In one embodiment, the format in which the hash sets are stored is as follows: <Customer A>:HashSet: <ObjectX>, wherein <Customer A> and <Object X> are placeholders for any customers (tenant) and object.

4.2 Example Methods for Inserting and Updating Data Records

Figure 5A:
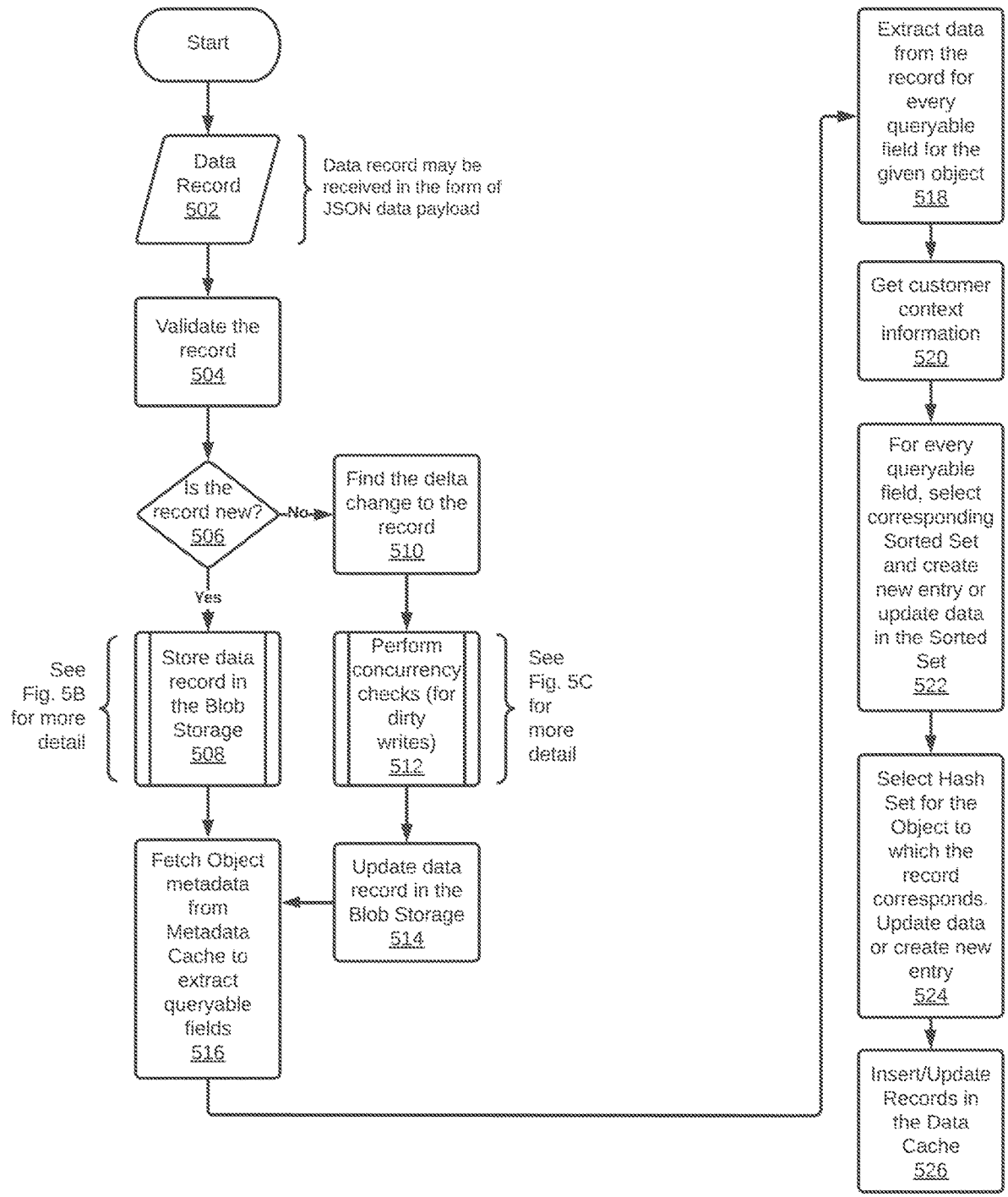
FIGS. 5A-5C are flowcharts that illustrate insert and update operations in an example implementation.
Figures 5B, 5C:
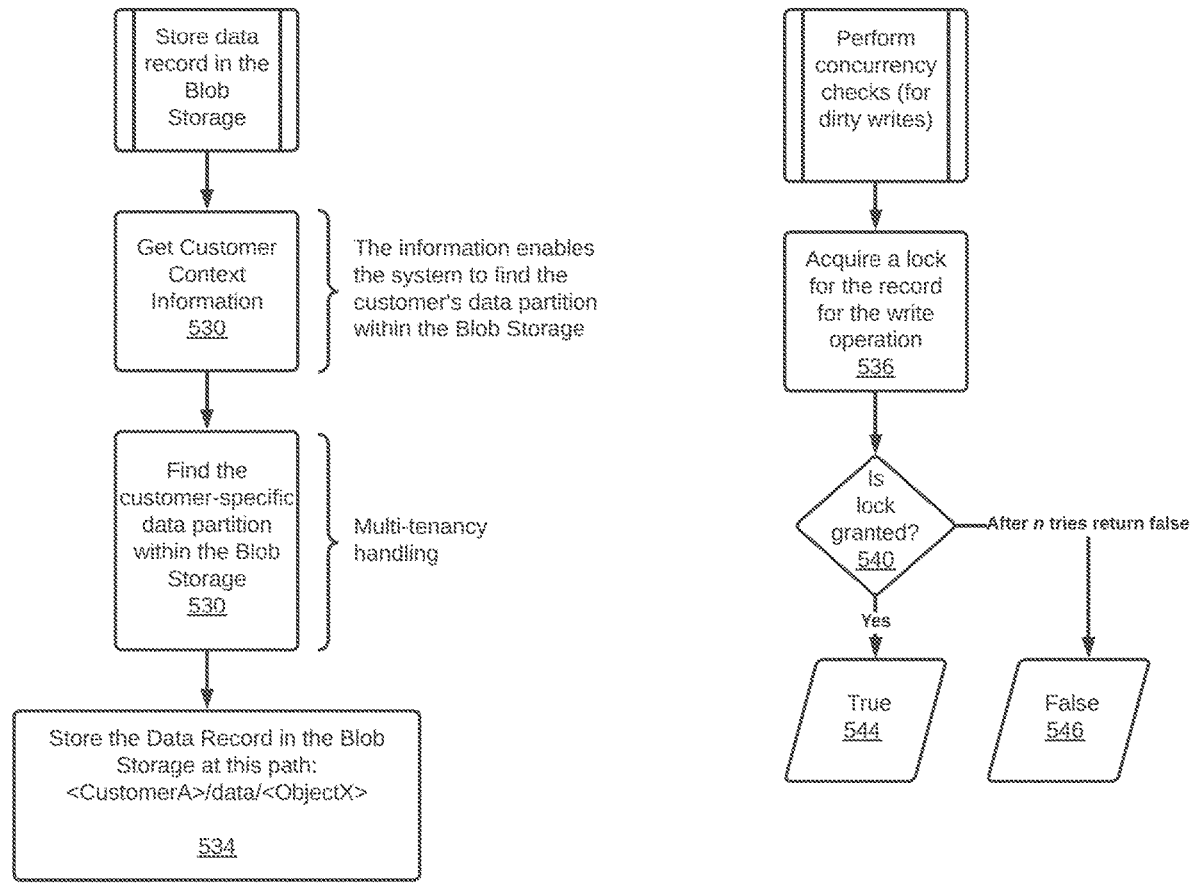

FIGS. 5A-5C related to insert and update operations in the system.

FIG. 5A illustrates a method for updating or writing a new record in the system. The system receives the data record that is either being created or updated (step 502). The system validates the data payload (step 504) and determines if the data record is new (step 506). If so, the system adds the data record to the blob storage under the applicable customer's partition (step 508), as described in more detail in FIG. 5B. If not, it finds the delta change in the record (step 510) and performs concurrency checks (step 512), which is described in more detail in FIG. 5C. If it passes the concurrency checks, the system updates the data record in the blob storage under the applicable customer partition (step 514).

The system then fetches the object metadata file from the metadata cache for the object to which the record corresponds, as the record is an instance of a particular object (step 516). The system uses the object metadata file to ascertain the queryable fields in the data object (also step 516). The system then extracts the data from the record for every queryable field for the given object (step 518).

The system obtains the customer context information for the customer that is saving the data record (step 520). This information is used to retrieve access the customer's sorted sets and hash sets in the PDC. For every queryable field for the given object, the sorted set for the object/field combination is selected and the field data from the record is added to the sorted set in the PDC (step 522). For a new record, this would involve creating a new entry in the sorted set (i.e., a new row). For an updated record, this involve updating the applicable entry in the sorted set to the extent the data for this field changed. For the given object corresponding to the record, the hash set for the object is selected and the queryable fields value in the record are added or updated in the hash set in the PDC (step 524).

The data record is also added or updated in the data cache (step 526).

FIG. 5B illustrates the steps for storing the data record in the blob storage in more detail. The system obtains the customer context information (step 530). As described above, this involves obtaining the "Blob connection string" for the customer. The system uses the blob connection strong to find customer's partition in the blob storage (step 532). The system then stores the data record in the blob storage (step 534). In one embodiment, the data record is stored as the path <Customer A>/data/<Object X>, where <Customer A> and <Object X>, are placeholders for any customer and any object.

FIG. 5C illustrates a method for performing a concurrency check (for dirty writes). The system acquires a lock for the updated record that the customer is attempting to save (step 536). If the lock is granted, then the system proceeds with writing the updated record to the blob storage (i.e., proceeds to step 514 in FIG. 5A) (step 540). If the lock is not granted, the system attempts to obtain the lock n more times, wherein n is a positive integer. If the lock is not granted after n tries, the system rejects the write request for the updated record (step 546).

4.3 Example Query Processing Methods

FIGS. 6A-6F are related to read operations in the system.

Figure 6A:
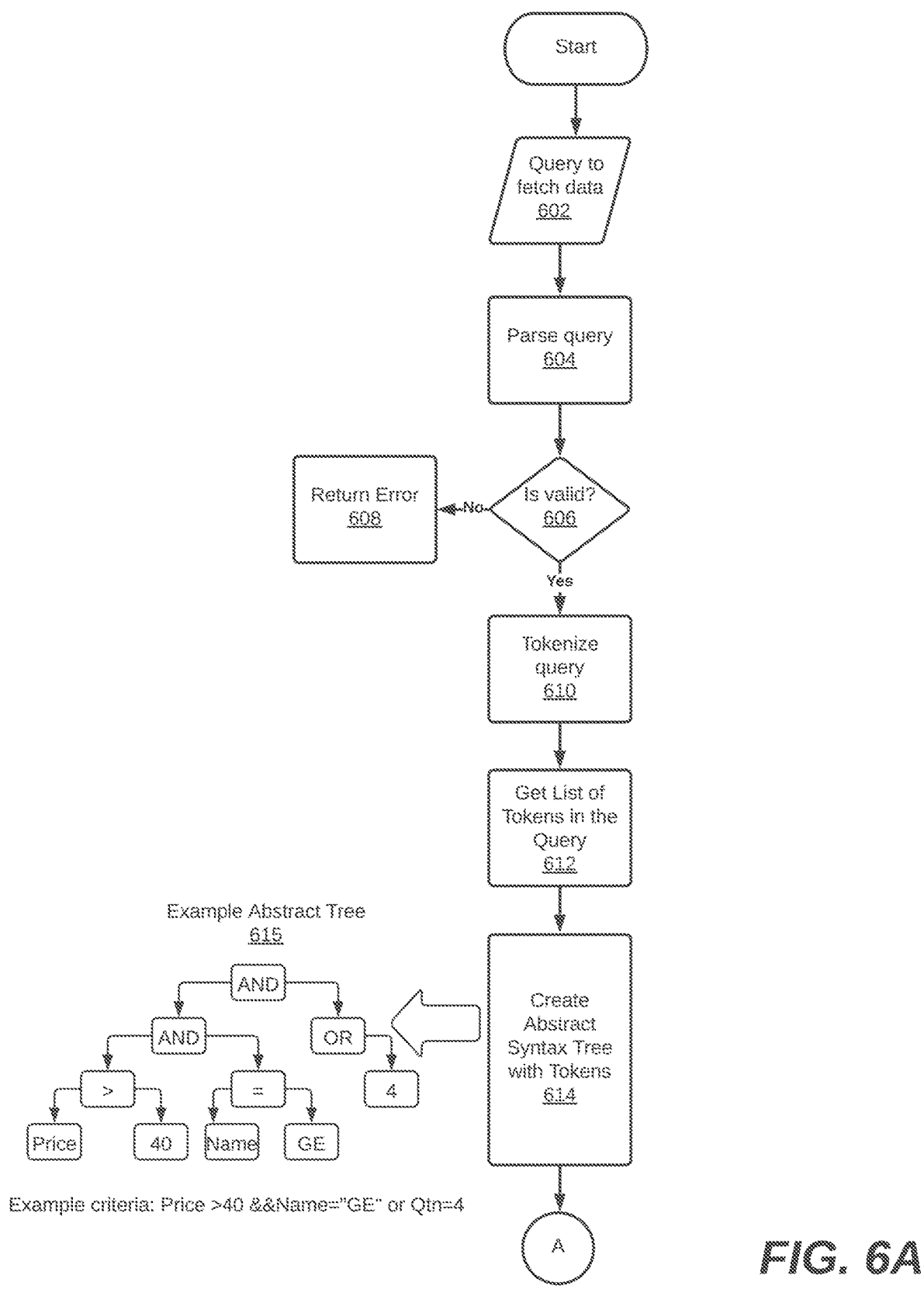
FIGS. 6A-6F are flowcharts that illustrate read-related operations in an example implementation.
Figure 6B:
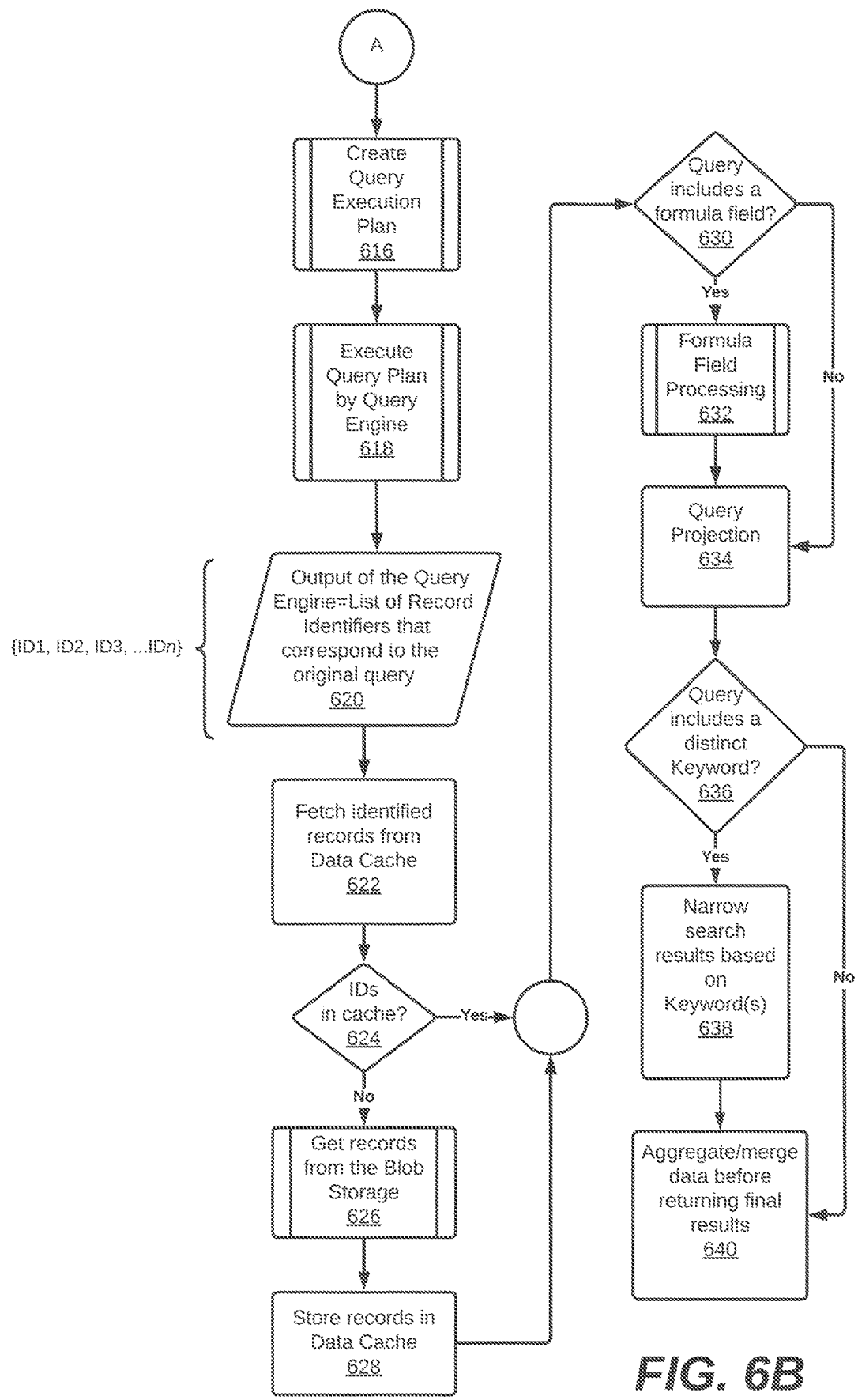

FIG. 6A-6B illustrates a method for retrieving data records in response to receiving a data query. The system receives a query to retrieve data (step 602). The system parses the query to extract search terms from the query and determine whether the query syntax is valid (steps 604, 606). In response to the query syntax being invalid, the system returns an error (step 608). In response to the query syntax being valid, the system tokenizes the query (step 610) and creates an abstract syntax tree with the tokens (steps 612 and 614). A pictorial representation 615 of an abstract syntax tree is illustrated in FIG. 6A.

The system creates a query execution plan using the abstract syntax tree (step 616). As described in more detail with respect to FIG. 6D, creating a query execution plan comprises creating an execution path, breaking the execution path in stages, and breaking the stages into one or more steps on the sorted set data structures and/or the hash set data structures. The system then executes the query execution plan by performing the steps on the sorted set and hash set data structures in the PDC (step 618). The output of the query execution plan is a list of record identifiers that correspond to the query (e.g., ID1, ID2, ID3, . . . IDn) (step 620).

After identifying the list of record identifiers that correspond to the query, the system first attempts to retrieve the records from the data cache (step 622). If any of the records are not in the data cache, the system obtains the records from the blob storage and then stores them in the data cache (steps 624-628).

The system determines if the query contains any formula fields (step 630). If so, the system processes the formula fields (step 632), as described in more detail in FIG. 6F. The system picks only those fields specified in the query (query projection) (step 634).

The system determines if the query contains one or more distinct keywords (step 636), and, if so, narrows the query result based on the keywords (step 638). The system then merges the results from any formula processing and keyword processing before returning the final search query results (step 640).

A sorted set operation has the time complexity of O(log (n)), and a hash set operation has the time complexity of O(1), which enables the query processing to be performed in a performant way. Algorithm time complexity is represented by "O". A time complexity of O(1) means that the run time for the operation does not change regardless of the input. In O(n), "n" represents the size of the data against which the operation is performed. In O(n), run time increases at an order of magnitude proportional to n. O(log(n)) is faster than O(n) as it uses ranking values to search fast. With O(log(n)), the time for each subsequent step in the operation is decreased at a magnitude inversely proportional to n.

Figure 6C:
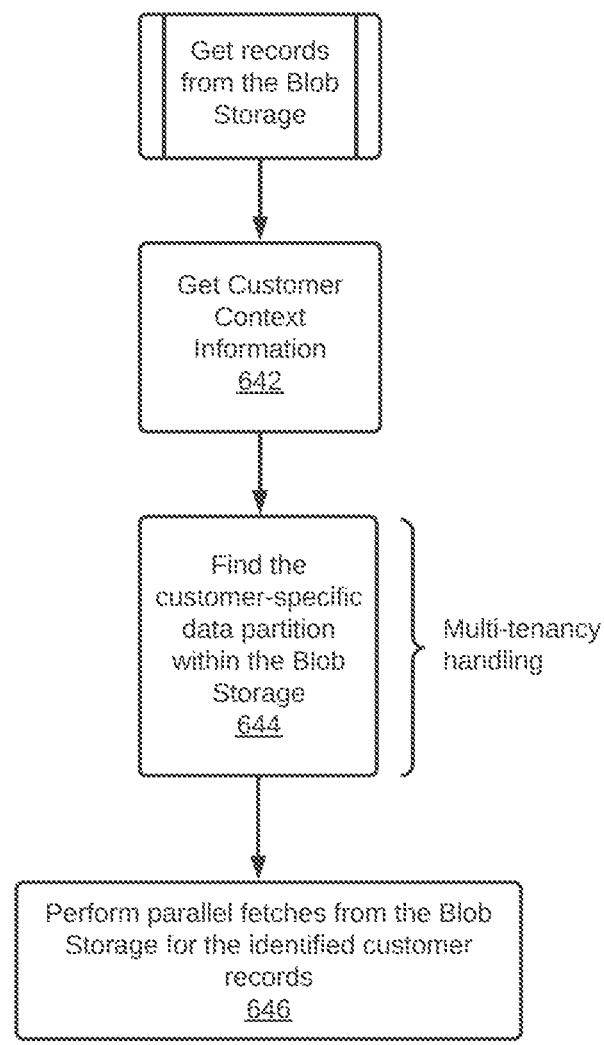

FIG. 6C illustrates the steps for retrieving records from the blob storage according to one embodiment. The system obtains the applicable customer context information in order to find the customer's data partition within the blob storage (steps 642, 644). The system them performs parallel fetches (reads) for the data records from the blob storage (step 646).

Figure 6D:
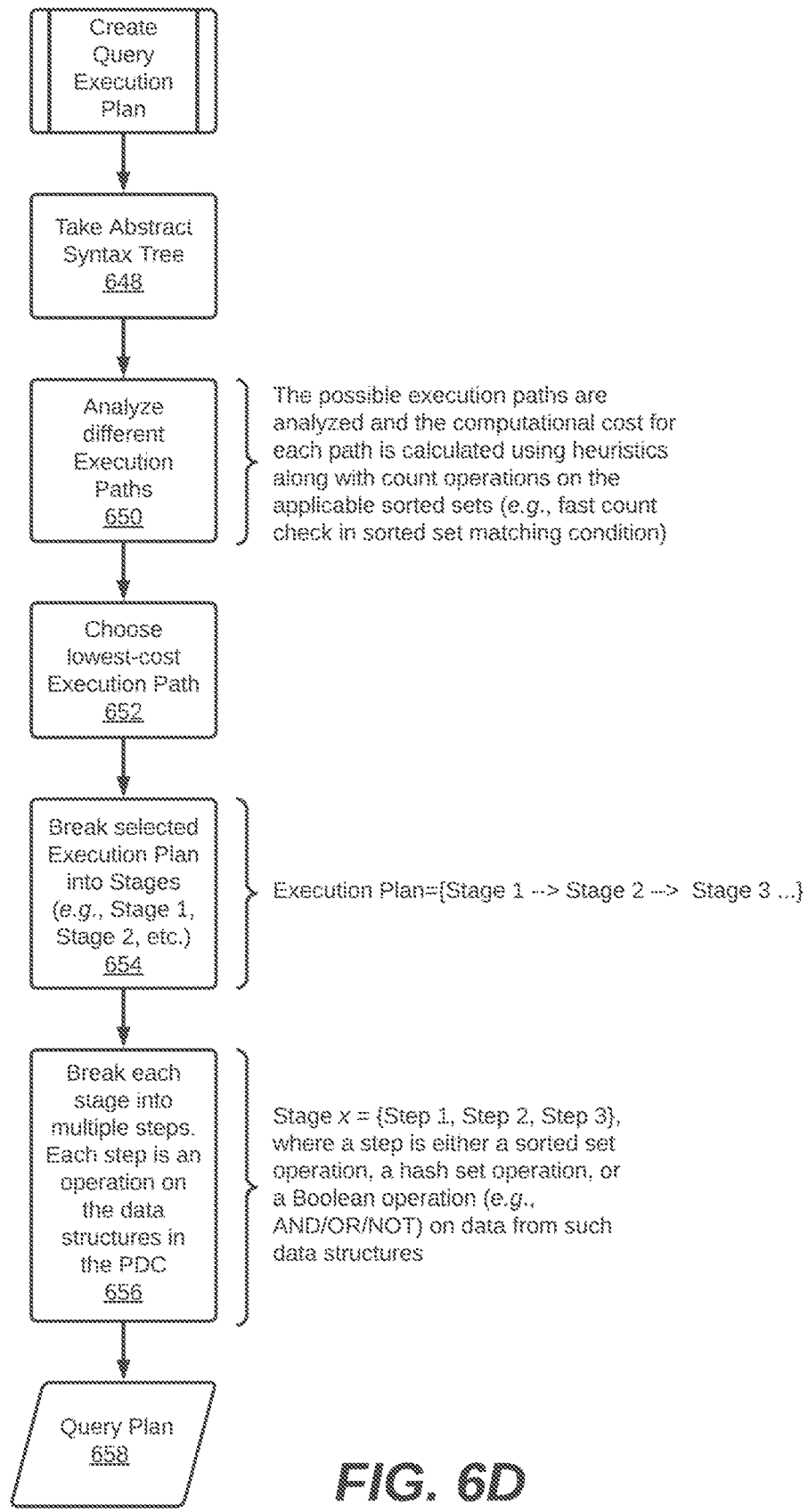

FIG. 6D illustrates the steps for creating a query execution plan according to one embodiment. The system takes the abstract syntax tree and analyzes different query execution paths (steps 648, 650). As discussed above, a query execution plan comprises a number of operations on the sorted set and hash set data structures in the PDC in order to identify the record IDs corresponding to the query. In one embodiment, a query plan consists of one or more of the following three actions: (1) fetch from a sorted set (or other type of first data structure), (2) fetch from a hash set (or other type of second data structure), and (3) perform a Boolean operation, such as an AND, OR, or NOT operation, on the data in the sorted sets and hash sets.

The analyzing step (i.e., step 650) comprises calculating a computation cost for each of a different order of operations that can be used to resolve the query. For example, assume the system receives the following query: SELECT from Quote WHERE Price=32.0 AND Quantity=7. There are least two different orders of operations for resolving the query. They are as follows:

Query Plan Option #1:
Step 1: Fetch from the Sorted Set for the "Price" field for the "Quote" object to get IDs for matching price=32.0. Assume it returns records IDs={34, 45, 76}
Step 2: Fetch from Hash Set for the "Quote" object the entries for those IDs from step 1;
Step 3: Apply the "AND Quantity=7" operation for record IDs from step 1. Assume this retuned record ID=45)
ID=45 is the final matched record that matches price=32 and quantity=7

Query Plan Option #2:
Step 1: Fetch from the Sorted Set for the "Quantity" field for the "Quote" object to get IDs for quantity=7.0. Assume it returns records IDs={5, 10, 12, 14, 34, 45, 76}
Step 2: Fetch from Hash Set for the "Quote" object the entries for those IDs from step 1;
Step 3: Apply the "AND Price=32.0" operation for record IDs from step 1. Assume this retuned record ID=45)
ID=45 is the final matched record that matches price=32 and quantity=7

The system would compute the computational cost with each of the options and choose the lowest cost option for the query plan (step 652).

The system breaks the execution path into stages (step 654). Every stage is then broken down into multiple steps (step 656). Each step is either a sorted set operation, a hash set operation, or a Boolean operation, such as AND/OR/NOT operations. The resulting lists of sorted set, hash set, and Boolean operations is outputted as the query plan (step 658).

Figure 6E:
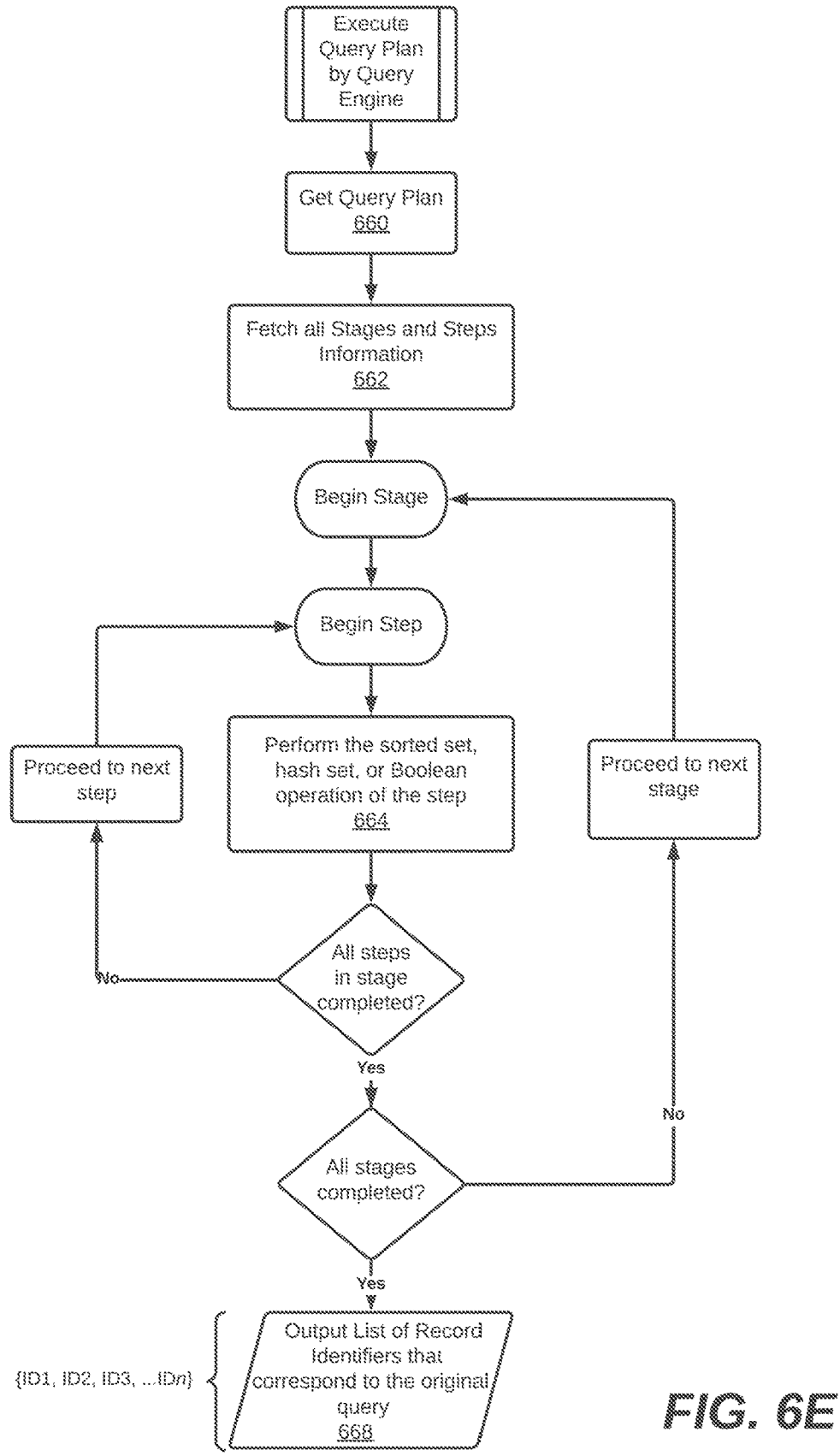

FIG. 6E illustrates in more detail how the Query Engine executes the query plan. The Query Engine obtains the query plan (step 660) and retrieves all the stage and step information from the query plan (step 662). For every step in a stage, the system performs the sorted set, hash set, or Boolean operation specified for that step. The steps are performed in order of the stages. This continues until all the steps in all the stages have been performed. The system then outputs the record IDs that satisfy the query (step 668), and the system proceeds to step 622 in FIG. 6A.

Figure 6F:
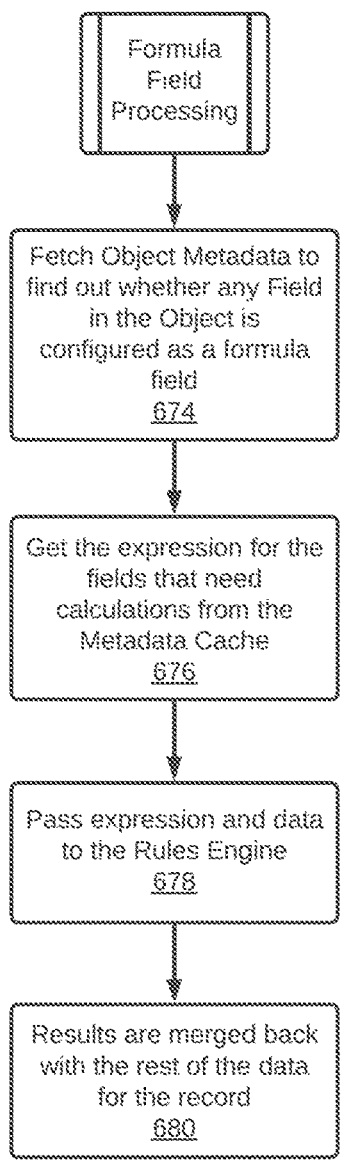

FIG. 6F illustrates a method for processing the formula fields according to one embodiment. The system retrieves the object metadata file from the metadata cache for the applicable record(s) (step 674). The system ascertains whether any fields in the object are configured as formula fields (also step 674). For each field configured as a formula, the system retrieves the mathematical expression (i.e., the formula) from the object metadata files (step 676). For each field configured as a formula field, the system passes the expression for the field and the data for the field to the rules engine, which calculates a value for the field based on the expression (step 678). The field value is merged back with the rest of the data for the record (step 680).

4.41 Example Architecture

Figure 7A:
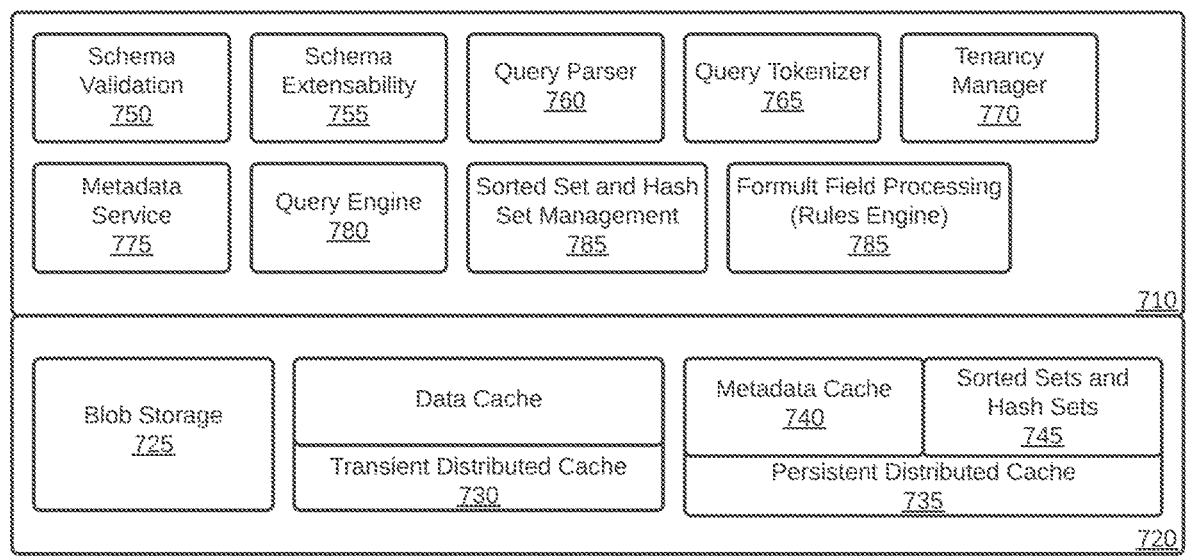
FIG. 7A-7B illustrates an example architecture for the system according to one embodiment.
Figure 7B:
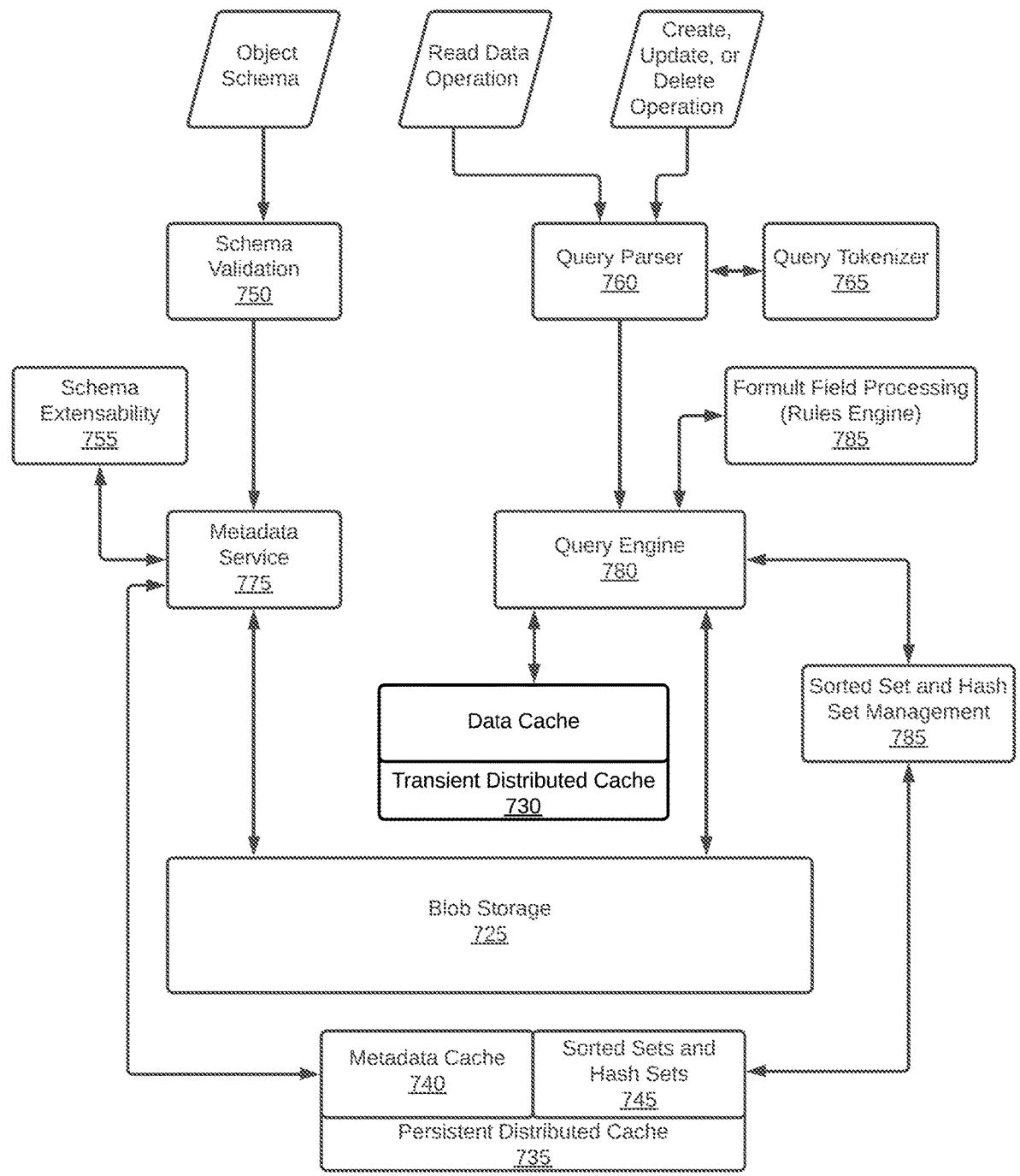

FIG. 7A illustrates an example architecture for the system 200 according to one embodiment. FIG. 7B illustrates the data flow through the modules illustrated in FIG. 7A.

Block 720 in FIG. 7A illustrates the storage devices used by the system. These devices are a distributed blob storage 725, a transient distributed cache 730 for caching a subset of data records, and a persistent distributed cache 735, that includes a metadata cache 740 and the first and second data structures on which query operations are processed. In this embodiment, the first and second data structures are in the form of sorted sets and hash sets 745. In this example, the storage devices illustrated in block 720 are part of a public cloud, such as AMAZON AWS or MICROSOFT AZURE, that are independent of the multi-tenant cloud-based application 210.

The application, or the platform on which the application 210 runs, includes the modules in block 710. These modules enable blob storage in the public cloud to be used as effective data storage and retrieval system that can handle complex data queries for application 210 at scale with low latency. The modules of block 710 include the following:

Schema Validation 750: Validates field and object definitions in response to the system receiving a data object schema definition.

Schema Extensibility 755: Enables customers to build on standard object definitions and create custom fields or custom objects.

Query Parser 760: Parses queries for data records. In certain embodiments, it is able to parse natural language queries and identify fields, operands, operators, and keywords in natural language queries.

Query Tokenizer 765: Tokenizes the query and builds abstract syntax tree.

Tenancy Manager 770: Performs the steps associated with "Get customer context information" steps in the flowcharts discussed above. Specifically, the Tenancy Manager takes the authentication token used by a user to access the system and resolves the token to a UserID and an OrganizationID (i.e., a customer identifier). It further resolves the information to a "Blob connection string" that enables the system to access the applicable customer-specific partition in the Blob Storage 725.

Metadata Service 775: Creates and stores the metadata file in the Blob Storage 725 and Metadata Cache 740.

Query Engine 780: Processes new and updated records and extracts queryable field data for storage in the sorted sets and hash sets. Creates and executes the query execution plan.

Sorted Set and Hash Set Management 785: Performs operations on the sorted sets and hash sets 745 in the Persistent Distributed Cache 735.

Formula Field Processing (Rules Engine) 790: Performs formula field processing, as described with respect to FIG. 6F.

5. General

The methods described with respect to FIGS. 2, 3A-3C, 4A-4C, 5A-5C, 6A-6F, and 7A-7B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for retrieving and storing data for a plurality of different customers of a multi-tenant cloud-based application, the method comprises:
    storing customer data records for a plurality of customers in a multi-tenant blob storage system, wherein:
        the blob storage includes partitions for each customer such that the data records for a customer are stored only in the customer's partition;
        the customer data records are instances of data objects defined by metadata; and
        each customer is able to define customer-specific data objects using metadata;
    for each customer, caching a subset of the customer's data records in a data cache;
    for each data object in the multi-tenant blob storage system, identifying the queryable fields of the data object using a metadata definition for the data object;
    for each queryable field of a data object in the blob storage system, creating a first data structure in a persistent distributed cache with values from the queryable field, wherein:
        the first data structure stores data in the form of sorted key-value pairs;
        the keys in the key-value pairs are the queryable field values extracted from the customer data records in the blob storage and the values in the key-value pairs are the corresponding record IDs of the customer data records from which the values were extracted; and
        the key-value pairs are sorted according to ranking criteria applied to the queryable field values;
    for each data object in the blob storage, creating a second data structure in the persistent distributed cache that stores the record IDs for the object in association with the queryable field values for the data object, wherein the data is stored in the form of key-value pairs, wherein each record ID for the object is a key and the queryable field values for that record ID is the corresponding value for said key-value pair;
    in response to receiving a data records query from a customer, performing the following:
        constructing a query plan comprising a plurality of fetch steps, wherein each fetch step in the query plan represents an operation on one of the first or second data structures in the persistent distributed cache;
        executing the query plan, wherein executing the query plan comprises:
            using the first and second data structures in the persistent distributed cache to identify any record IDs that satisfy the query conditions; and
            retrieving the data records having the identified record IDs from the blob storage or from the data cache using parallel fetch operations.

2. A method, performed by a computer system, for retrieving and storing data for a plurality of different customers of a multi-tenant cloud-based application, wherein the method comprises:
    enabling a plurality of different customers to define customer-specific data objects using a data object schema definition for each data object, wherein a data object schema definition is a metadata definition;
    receiving data object schema definitions for data objects from different customers;
    for each data object schema definition received from a customer, performing the following:
        using the data object schema definition to identify the queryable fields for the data structure;
        creating a first data structure in a persistent distributed cache for each queryable field in the data object, wherein the first data structure has a key field for storing the values of the queryable field for instances of the data object, and a value field for storing the corresponding record IDs of the instances of the data object;
        creating a second data structure in the persistent distributed cache for the data object, wherein the second data structure has a key field for storing record IDs of instances of the data object and a value field for storing corresponding queryable field values and wherein each of the first and second data structures is specific to a customer;

receiving customer data records for storage, wherein:
the customer data records are instances of data objects defined by data object schema definitions;
the system receives and stores data records for a plurality of different customers;
for each data record received from a customer, the system performs the following:
storing the data recording in a multi-tenant blob storage system, wherein the blob storage includes partitions for each customer such that the data records for a customer are stored only in the customer's partition;
identifying the queryable fields in the data record using the data object schema definition for the data object to which the data record corresponds;
extracting values for the queryable fields from the data records; and
adding the queryable field values and the record ID of the data record to the customer's first and second data structures for the data object to which the data record corresponds in the persistent distributed cache; wherein for each first data structure, the key-value pairs in the first data structure are sorted according to a ranking criterion applied to the queryable field values in the first data structure; and
a subset of customer data records is also stored in a transient data cache;

receiving a data records query from a customer;
constructing a query plan comprising a plurality of fetch steps, wherein each fetch step in the query plan represents an operation on one of the customer's first or second data structures in the persistent distributed cache;
executing the query plan, wherein executing the query plan comprises:
using the customer's first and second data structures in the persistent distributed cache to identify any record IDs that satisfy the query conditions; and
retrieving the data records having the identified record IDs from the customer's partition in the blob storage or from the data cache using parallel fetch operations.

3. The method of claim 2, wherein creating a query plan comprises converting the data records query to an abstract syntax tree.

4. The method of claim 2, wherein creating a query plan further comprises assessing a computational cost associated with each of a plurality of different combinations of fetch steps and selecting the combination of fetch steps associated with the lowest computational cost.

5. The method of claim 2, wherein the first data structure is a sorted set and the second data structure is a hash set.

6. The method of claim 2, wherein the multi-tenant cloud-based application is a quote-to-cash application.

7. The method of claim 2, wherein the ranking criterion for a sorted set is dependent on whether the queryable field values for the sorted set are strings or numbers, wherein if the queryable field values are strings, the key-value pairs are sorted lexicographically based on the queryable field values and if the queryable field values are numbers, the key-value pairs are sorted in ascending or descending order of the queryable field values.

8. The method of claim 2, wherein a score is calculated for each key in a sorted set by applying the ranking criteria to the key, and the key-value pairs in the set are sorted according to the key scores.

9. A non-transitory computer-readable medium comprising a computer program, that, when executed by a computer system, enables the computer system to perform the following method for retrieving and storing data for a plurality of different customers of a multi-tenant cloud-based application, wherein the method comprises:

enabling a plurality of different customers to define customer-specific data objects using a data object schema definition for each data object, wherein a data object schema definition is a metadata definition;

receiving data object schema definitions for data objects from different customers;

for each data object schema definition received from a customer, performing the following:
using the data object schema definition to identify the queryable fields for the data structure;
creating a first data structure in a persistent distributed cache for each queryable field in the data object, wherein the first data structure has a key field for storing the values of the queryable field for instances of the data object, and a value field for storing the corresponding record IDs of the instances of the data object;
creating a second data structure in the persistent distributed cache for the data object, wherein the second data structure has a key field for storing record IDs of instances of the data object and a value field for storing corresponding queryable field values and wherein each of the first and second data structures is specific to a customer;

receiving customer data records for storage, wherein:
the customer data records are instances of data objects defined by data object schema definitions;
the system receives and stores data records for a plurality of different customers;
for each data record received from a customer, the system performs the following:
storing the data recording in a multi-tenant blob storage system, wherein the blob storage includes partitions for each customer such that the data records for a customer are stored only in the customer's partition;
identifying the queryable fields in the data record using the data object schema definition for the data object to which the data record corresponds;
extracting values for the queryable fields from the data records; and
adding the queryable field values and the record ID of the data record to the customer's first and second data structures for the data object to which the data record corresponds in the persistent distributed cache; wherein for each first data structure, the key-value pairs in the first data structure are sorted according to a ranking criterion applied to the queryable field values in the first data structure; and
a subset of customer data records is also stored in a transient data cache;

receiving a data records query from a customer;
constructing a query plan comprising a plurality of fetch steps, wherein each fetch step in the query plan represents an operation on one of the customer's first or second data structures in the persistent distributed cache;

executing the query plan, wherein executing the query plan comprises:

using the customer's first and second data structures in the persistent distributed cache to identify any record IDs that satisfy the query conditions; and retrieving the data records having the identified record IDs from the customer's partition in the blob storage or from the data cache using parallel fetch operations.

10. The non-transitory computer-readable medium of claim 9, wherein creating a query plan comprises converting the data records query to an abstract syntax tree.

11. The non-transitory computer-readable medium of claim 9, wherein creating a query plan further comprises assessing a computational cost associated with each of a plurality of different combinations of fetch steps and selecting the combination of fetch steps associated with the lowest computational cost.

12. The non-transitory computer-readable medium of claim 9, wherein the first data structure is a sorted set.

13. The non-transitory computer-readable medium of claim 9, wherein the second data structure is a hash set.

14. The non-transitory computer-readable medium of claim 9, wherein the multi-tenant cloud-based application is a quote-to-cash application.

15. The non-transitory computer-readable medium of claim 9, wherein the ranking criteria for a sorted set is dependent on whether the queryable field values for the sorted set are strings or numbers, wherein if the queryable field values are strings, the key-value pairs are sorted lexicographically based on the queryable field values and if the queryable field values are numbers, the key-value pairs are sorted in ascending or descending order of the queryable field values.

16. The non-transitory computer-readable medium of claim 9, wherein a score is calculated for each key in a sorted set by applying the ranking criteria to the key, and the key-value pairs in the set are sorted according to the key scores.

17. A computer system for retrieving and storing data for a plurality of different customers of a multi-tenant cloud-based application, wherein the system comprises:

one or more processors;

one or more memory units coupled to the one or more processors, wherein the one or more memory units store instructions that, when executed by the one or more processors, cause the system to perform the operations of:

enabling a plurality of different customers to define customer-specific data objects using a data object schema definition for each data object, wherein a data object schema definition is a metadata definition;

receiving data object schema definitions for data objects from different customers;

for each data object schema definition received from a customer, performing the following:

using the data object schema definition to identify the queryable fields for the data structure;

creating a first data structure in a persistent distributed cache for each queryable field in the data object, wherein the first data structure has a key field for storing the values of the queryable field for instances of the data object, and a value field for storing the corresponding record IDs of the instances of the data object;

creating a second data structure in the persistent distributed cache for the data object, wherein the second data structure has a key field for storing record IDs of instances of the data object and a value field for storing corresponding queryable field values and wherein each of the first and second data structures is specific to a customer;

receiving customer data records for storage, wherein:

the customer data records are instances of data objects defined by data object schema definitions;

the system receives and stores data records for a plurality of different customers;

for each data record received from a customer, the system performs the following:

storing the data recording in a multi-tenant blob storage system, wherein the blob storage includes partitions for each customer such that the data records for a customer are stored only in the customer's partition;

identifying the queryable fields in the data record using the data object schema definition for the data object to which the data record corresponds;

extracting values for the queryable fields from the data records; and adding the queryable field values and the record ID of the data record to the customer's first and second data structures for the data object to which the data record corresponds in the persistent distributed cache; wherein for each first data structure, the key-value pairs in the first data structure are sorted according to a ranking criterion applied to the queryable field values in the first data structure; and a subset of customer data records is also stored in a transient data cache;

receiving a data records query from a customer;

constructing a query plan comprising a plurality of fetch steps, wherein each fetch step in the query plan represents an operation on one of the customer's first or second data structures in the persistent distributed cache;

executing the query plan, wherein executing the query plan comprises:

using the customer's first and second data structures in the persistent distributed cache to identify any record IDs that satisfy the query conditions; and retrieving the data records having the identified record IDs from the customer's partition in the blob storage or from the data cache using parallel fetch operations.

18. The system of claim 17, wherein creating a query plan further comprises assessing a computational cost associated with each of a plurality of different combinations of fetch steps and selecting the combination of fetch steps associated with the lowest computational cost.

19. The system of claim 17, wherein the first data structure is a sorted set and the second data structure is a hash set.

20. The system of claim 17, wherein the ranking criterion for a sorted set is dependent on whether the queryable field values for the sorted set are strings or numbers, wherein if the queryable field values are strings, the key-value pairs are sorted lexicographically based on the queryable field values and if the queryable field values are numbers, the key-value pairs are sorted in ascending or descending order of the queryable field values.

* * * * *